(12) United States Patent
Keller et al.

(10) Patent No.: US 8,311,036 B2
(45) Date of Patent: Nov. 13, 2012

(54) DEVICE BASED EMERGENCY SERVICES FOR CROSS CLUSTER EXTENSION MOBILITY

(75) Inventors: Daniel Scott Keller, San Jose, CA (US); Atul Trasi, Potomac Falls, VA (US)

(73) Assignee: Cisco Technology, Inc., San Jose, CA (US)

( * ) Notice: Subject to any disclaimer, the term of this patent is extended or adjusted under 35 U.S.C. 154(b) by 1005 days.

(21) Appl. No.: 12/333,858

(22) Filed: Dec. 12, 2008

(65) Prior Publication Data

US 2010/0150135 A1 Jun. 17, 2010

(51) Int. Cl.
H04L 12/66 (2006.01)
H04M 11/00 (2006.01)

(52) U.S. Cl. .............................. 370/352; 379/37; 379/45

(58) Field of Classification Search ............ 379/207.14, 379/221.01, 221.14, 221.15, 37, 45; 370/352
See application file for complete search history.

(56) References Cited

U.S. PATENT DOCUMENTS

| 6,839,418 | B1* | 1/2005 | Saarenpaa ................ 379/211.02 |
| 6,975,718 | B1* | 12/2005 | Pearce et al. ............. 379/221.01 |
| 7,546,112 | B2* | 6/2009 | Cheng ........................ 455/404.2 |
| 2005/0169248 | A1* | 8/2005 | Truesdale et al. ............. 370/352 |
| 2005/0190892 | A1* | 9/2005 | Dawson et al. ................. 379/37 |
| 2005/0235158 | A1 | 10/2005 | Shaffer et al. |
| 2006/0280164 | A1* | 12/2006 | Dickinson et al. ............ 370/352 |
| 2007/0242660 | A1* | 10/2007 | Xu ................................ 370/352 |
| 2009/0196284 | A1* | 8/2009 | Beinroth ....................... 370/352 |

OTHER PUBLICATIONS

The prosecution history of U.S. Appl. No. 12/333,818.
The prosecution history of U.S. Appl. No. 12/404,868.

* cited by examiner

*Primary Examiner* — Yuwen Pan
*Assistant Examiner* — Sonia Gay
(74) *Attorney, Agent, or Firm* — Brinks Hofer Gilson & Lione

(57) ABSTRACT

A system is disclosed. The system has a call data receiver arranged to receive call data comprising number data indicative of a telephone number associated with a call connection request. The system also has a translator arranged to translate the received number data to obtain translated number data indicative of another telephone number. There is also a number data associator for associating the call connection request with the translated number data.

19 Claims, 3 Drawing Sheets

DEVICE BASED EMERGENCY SERVICES FOR CROSS CLUSTER EXTENSION MOBILITY

TECHNICAL FIELD

The present disclosure relates generally to a method and system for connecting a voice-over-IP call and specifically but not exclusively to a method and system for connecting an emergency voice-over-IP call.

BACKGROUND

Voice calls made over the internet, or voice-over-IP (VoIP), have become increasingly popular.

Some VoIP systems comprise IP telephones, such as those belonging to the Cisco Unified IP Phones 7900 Series. Each IP phone is connected to the Internet and is in communication with a communication server, also connected to the Internet, which manages call connections. Typically, a user can log into any one of a number of IP phones in communication with the communication server and make calls. The IP phone the user logs into takes on a personal phone number that belongs to the user, not the phone as in a traditional POTS or PSTN systems. This is called extension mobility.

It is also possible, in some VoIP networks, for a mobile worker to log into a phone in another geographical area serviced by another communications server, but to have this phone behave as if connected to the first mentioned communications server.

On arrival at a new location within the geographical area, the mobile worker logs into the IP phone. Calls to the user's personal phone number are received at the phone the user has logged on to. Phone calls placed by the user are processed as if the user was located at their usual office phone.

BRIEF DESCRIPTION OF THE DRAWINGS

In order to provide a better understanding, example embodiments will now be described in greater detail, by way of example only, with reference to the accompanying figures, in which.

DESCRIPTION OF EXAMPLE EMBODIMENTS

Overview

According to a first embodiment there is provided a method comprising:
receiving call data comprising number data indicative of a telephone number associated with a call connection request;
translating the received number data to obtain translated number data indicative of another telephone number; and
associating the call connection request with the translated number data.

According to a second embodiment there is provided a method comprising:
receiving a call connection request associated with translated number data comprising a translation of number data indicative of a telephone number associated with the call connection request.

According to a third embodiment there is provided a system comprising:
a call data receiver arranged to receive call data comprising number data indicative of a telephone number associated with a call connection request;
a translator arranged to translate the received number data to obtain translated number data indicative of another telephone number; and
a number data associator for associating the call connection request with the translated number data.

According to a fourth embodiment there is provided a system comprising:
a call connection request receiver arranged to receive a call connection request associated with translated number data comprising a translation of number data indicative of a telephone number associated with the call connection request.

Figure 1:
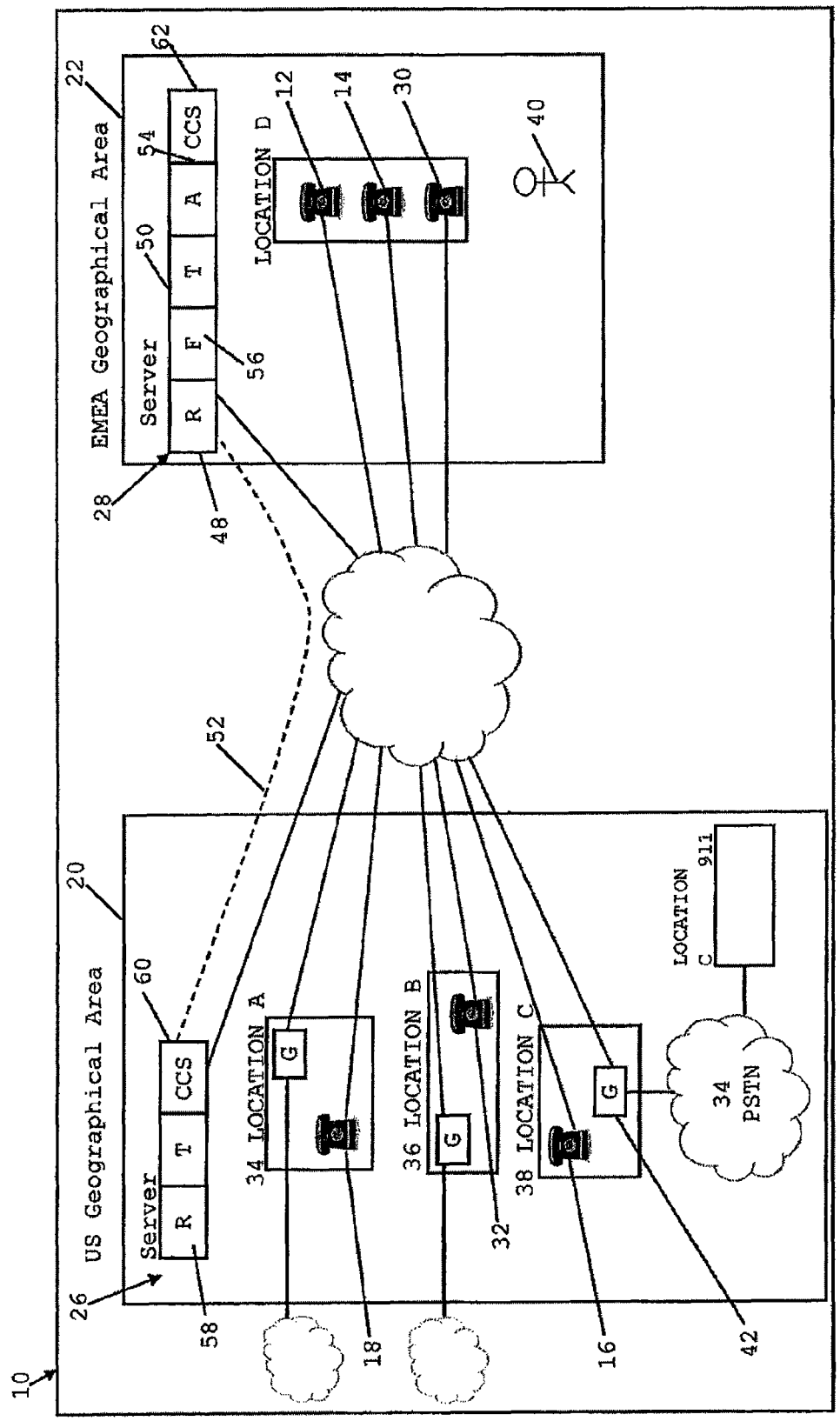
FIG. 1. shows a schematic diagram of an embodiment of a VoIP network.

FIG. 1 shows a schematic diagram of one embodiment of a plurality of internet protocol (IP) devices, such as 12, 14, 16 & 18, connected to a network generally indicated by the numeral 10. The network 10 in this embodiment is a VoIP solution contained in one customer network. In this embodiment, the IP devices, such as 12 and 18, are capable of sustaining a voice call between the other devices over an internet protocol layer of the network 10. An example of such a device is an IP phone. The IP device may alternatively be a personal computer running VoIP software or other appropriate device. In this embodiment, the network 10 runs over the internet.

The network 10 is divided into two geographical areas generally indicated by the numerals 20 and 22 respectively. IP devices 12, 14 and 30 are located in the Europe, Middle East and Africa (EMEA) geographical area 22. IP devices 16, 18 and 32 are located in the US geographical area 20. Some networks have more than two geographical areas. The geographical areas 20 & 22 each have one or more communication manager servers such as 26 and 28. The IP devices 12, 30 and 14 are in communication with the communication manager server 28 located in the EMEA geographical area 22. The servers 26 and 28 facilitate connection between IP devices. The telephone calls generally pass through them and are managed by them. The geographical areas are interconnected by a Trunk 52, which in this embodiment is a variant on a H225 protocol or SIP protocol connection over the IP layer of the network 10. Geographical area 20 is divided into locations such as location A, location B, and location C indicated by numerals 34, 36 and 38 respectively. Each location may include a plurality of IP phones.

The term "server" in this specification is intended to encompass any combination of hardware and software that performs services for connected clients in part of a client-server architecture. The client and a server may be separate software running on a single piece of hardware or a plurality of connected pieces of hardware.

The server hardware may be a specialized device or a general purpose computer.

A user 40 is normally based in the EMEA geographical area 22. The user's usual IP phone is 14. However, in this example, the user 40 has traveled to location C in the US geographical area 20 and logged onto IP Phone 16. The IP phone 16, usually registered with the US server 26, is now registered with the EMEA server 28. Calls made to and from phone 16 by logged in user 40 behave as if the user is in location D within the EMEA geographical area.

In case of an emergency at location C, the user 40 may wish to contact local emergency services using the IP phone 16. In this embodiment, the communication manager servers 26 and 28 are arranged to correctly connect an emergency call placed by user 40 on IP phone 16 to a number servicing location C, even though all other phone calls are processed as if the user 40 was located at their usual phone 14 at location D. For example, if the user 40 dials the European emergency number 112 on IP phone 16, the servers 26, 28 will arrange for a gateway 42, which accesses the Public Switched Telephone Network (PSTN) 34, to connect to 911 emergency for location C. 911 Emergency is one example of Public Service Access Point (PSAP). Of course, any type of emergency contact point may be connected as appropriate. Other types of PSAPs may be similarly connected. The servers 26, 28, in some embodiments, may be arranged to connect other dialed emergency numbers. For example, dialing one of the emergency numbers 911 (US), 000 (Australia), 119 (South East Asia), 111 (New Zealand) on the IP phone 16 may result in a connection to 911 emergency for the Public Service Access Point (PSAP) appropriate for location C.

The EMEA server 28 has a call data receiver 48 arranged to receive call data comprising number data indicative of the number dialed by the user 40. In this example, the dialed number is an emergency telephone number, 911. The call data also comprises location data indicative of the user's 40 location 38 (location C). The EMEA server 28 has a translator 50 arranged to translate the received number data to obtain translated number data indicative of another telephone number. Generally, one or more translation patterns are used to manipulate the dialed digits before routing the call. A translation pattern is applied to the number data. For example, if the number dialed by the user 40 on IP phone 16 is 911 then the site code for location C—that is 415—and the trunk code for the trunk 52 connecting the servers 26, 28, in this case 888—are concatinated to obtain the string 888.415.911. The EMEA server 28 also has an associator 54 for associating the call connection request with the translated number data instead of the original number data. Of course, this is merely an example and the invention is not limited to this example.

The EMEA server 28 also has a call forwarder 56 arranged to forward the call connection request and the associated translated number data to the US server 26. First, the EMEA server 28 strips 888 from the string and sends 415.911 down the trunk 52 to the US server 26.

The US server 26 has a call connection request receiver 58 arranged to receive the same call connection request but associated with the new number data comprising the translation of the original number data. The US server 26 receives 415.911 and applies another translation pattern to it, as follows. The site code and/or emergency number are matched. Any pre-dot digits are stripped. The Calling Line Identification (CLID) number that is associated with the call is changed to a number that can be matched to a physical location of the IP phone 16, the number being, in this example, in the form 415xxxxxxx appropriate for location C with an area code 415. The emergency service can then locate the person 40 automatically.

Figure 2:
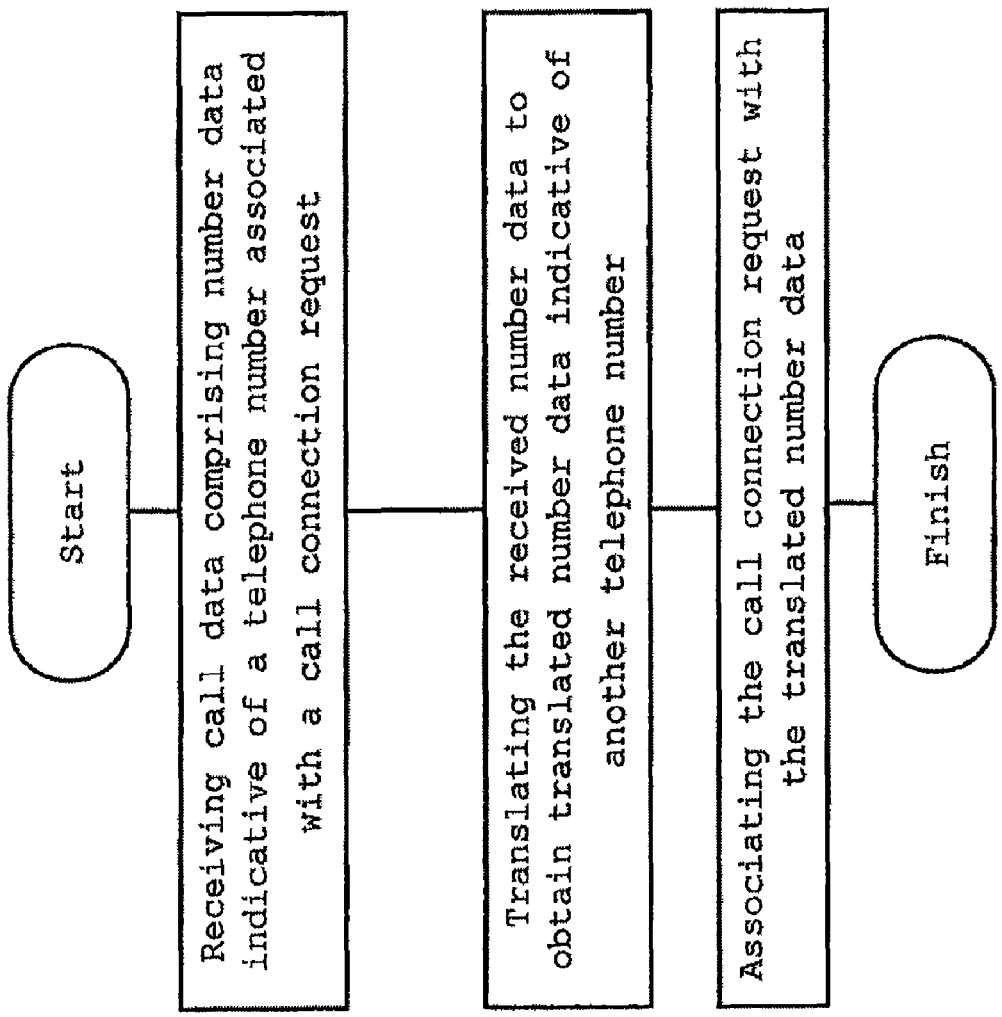
FIG. 2. shows a flow diagram of an embodiment of a method associated with a system connected to the VoIP network of FIG. 1.
Figure 3:
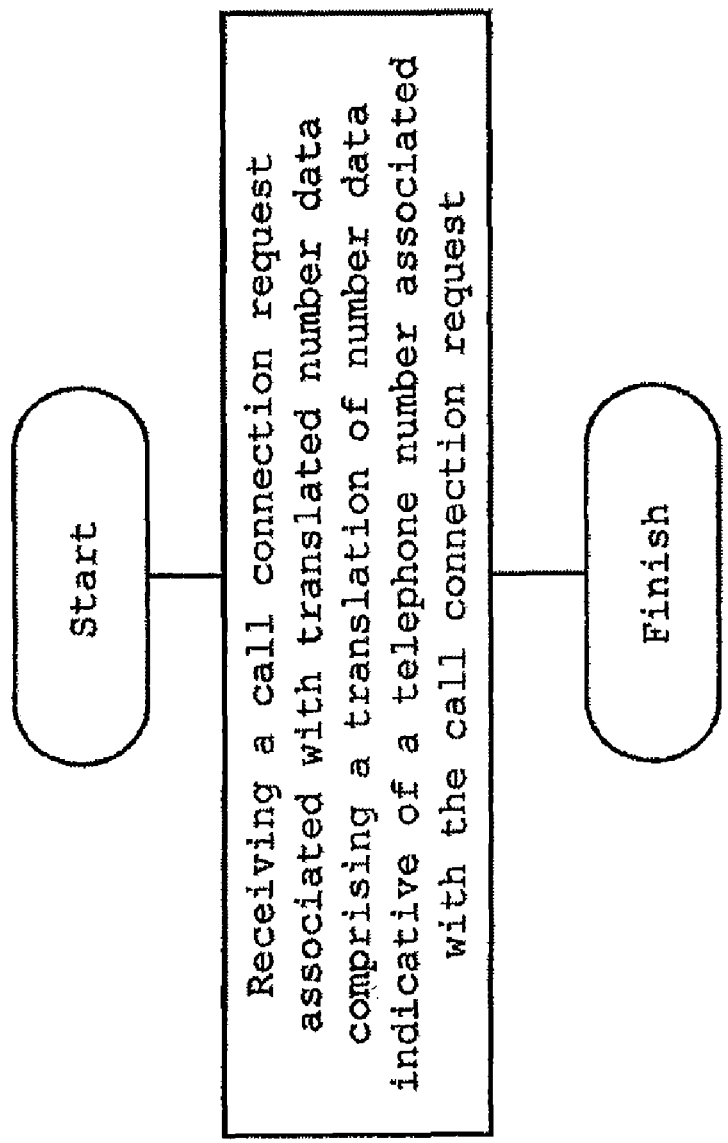
FIG. 3. shows a flow diagram of another embodiment of a method associated with another system connected to the VoIP network of FIG. 1.

The steps performed by the servers 26, 28, at least for the above described embodiment, are shown in FIGS. 2 and 3 respectively. Each of the methods shown in FIGS. 2 and 3 are implemented by a computer controlled by a computer program having instructions in accordance to the respective methods. Each of the computer programs may be provided by a computer readable medium. Logic may be encoded in one or more tangible media for execution and when executed operable to perform the steps of the methods in FIGS. 2 and 3.

The tangible media may include hard drive, flash memory, EPROM, EEPROM, RAM, DVD or CD, or any other types of suitable media.

In this embodiment, connecting the correct emergency number is achieved by exploiting a Calling Search Space (CSS) which includes a database and an associated program that accesses the database. Typically, the servers 26, 28 are each loaded with an emergency CSS 60, 62 corresponding to a location. The emergency CSS in both servers 26, 28 may contain as many translation patterns as there are emergency numbers across many different geographical areas including the US 20 and EMEA 22.

The CSS on the US server 26 may have one or more emergency numbers defined for the country in which the phone 16 is physically located. Other country emergency numbers can also be defined here.

The CSS record corresponding to an emergency number at location C includes a translation pattern that when applied prepends the trunk code as well as the location prefix code and finally the emergency number.

The EMEA server 28 CCS 60 has a translation pattern that strips the site prefix code.

In another example that exploits CSS's, there are two geographical areas, one in the US, and one in EMEA. The US area is centered at Raleigh (location A) with two other locations in San Francisco (location C) and Dallas (location B). Phones in each site have a device based CSS of CSS_911 for XXX where XXX represents the location—RLG, SFO or DAL respectively.

On the EMEA server 28, the administrator will create a CSS with the same name as phones in the US sites (CSS_911 for SFO, CSS_911 for RLG, CSS_911 for DAL etc.). The CSS name match is intended to make configuration easier.

Each CSS on the EMEA server 28 has a partition that will contain as many Translation Patterns as there are emergency numbers across all geographical areas, such as 112, 911, and 000. The translation patterns will be for the emergency numbers for these locations. They will also prefix the trunk code and a location prefix code to the emergency number.

So, for an SFO phone, the CSS—911 for 415 translation pattern adds 888.415. as a prefix to 911 when dialed. In the case that 112 is dialed from the SFO phone, the CSS translation pattern in the EMEA server 28 will convert the dialed number to 888.415.911.

The administrator, in setting up the servers, creates translation patterns. Further translation patterns can then be applied when the call is returned to the US server 20. So, for a phone in SFO, there would be a corresponding CSS_911_for_911 translation pattern for inbound 415.911. Also, this translation pattern must have a Calling Party Transformation Mask to change the CLID to reflect a location known to the PSAP, for example 415XXXXXXX. The ICT code may or may not be sent from the originating side which makes it a configuration matter for the server administrator. The receiving server would match the 415.911 Translation Pattern, strip pre-dot digits and use the CSS of the devices for the SFO location. The server then sends a call to a local Gateway 42 in SFO for 911. The called party, a PSAP in this case, will see the CLID to be a known number (415XXXXXXX) and will be able to obtain the phone's physical location (address) from an Automatic Location Identification database.

Although the above described embodiment has geographic areas that encompass continents and/or nations, it will be appreciated that a geographic area may be of any scale, such as a state, county, city, suburb, street or even room in a building. Each of these example geographic areas may be divided into corresponding locations. For example, if the geographical area encompasses a city then the location may be a suburb.

Now that embodiments have been described, it will be appreciated that some embodiments have some of the following advantages:

An emergency number dialed on an IP phone will result in connection to an emergency service number local to the IP phone or device, and not to the logged in user's usual IP phone or device located remotely.

Any number of numbers can be dialed from the device and the call connected to the correct local number, even if that number is not normally recognized in the device's locality.

The method and system may also be arranged to similarly handle any number, such as numbers for a help desk or service representative, not just an emergency number.

The invention claimed is:

1. A method comprising:
receiving call data at a computer, the call data comprising number data indicative of a first telephone number associated with a call connection request that originated from an internet protocol (IP) device over a voice over internet protocol (VoIP) network, the call data further comprising location data indicative of a geographical location of the IP device from which the call connection request originated instead of a geographical location that is assigned to a user of the IP device, where the first telephone number is indicative of a first emergency telephone number associated with the geographical location assigned to the user of the IP device;
translating, with the computer, the number data into translated number data indicative of a second telephone number based on the location data indicative of the geographical location of the IP device from which the call connection request originated instead of the geographical location that is assigned to the user of the IP device, where the second telephone number is indicative of a second emergency telephone number associated with the geographical location of the IP device; and
forwarding the call connection request with the computer to the second telephone number.

2. The method of claim 1 wherein translating the number data comprises applying a translation pattern to the number data.

3. The method of claim 2 wherein the translation pattern is selected from a plurality of translation patterns in accordance with the location data indicative of the geographical location of the IP device from which the call connection request originated instead of the geographical location that is assigned to the user of the IP device.

4. The method of claim 2 wherein the number data comprises a string of alphanumeric digits and applying the translation pattern comprises concatenating a site code and the string, the site code being indicative of the geographical location of the IP device.

5. The method of claim 2 wherein the number data comprises a string of alphanumeric digits, and applying the translation pattern comprises concatenating an Inter Cluster Trunk (ICT) code and the string, the ICT code being indicative of a geographical area in which the geographical location of the IP device from which the call connection request originated is located.

6. The method of claim 1 wherein translation of the number data is performed by a Calling Search Space.

7. A method comprising:
receiving a first call connection request, at a computer, the first call connection request associated with a first translated number data comprising a translation of number data indicative of a first telephone number associated with a second call connection request that originated from an internet protocol (IP) device on a Voice Over Internet Protocol (VoIP) network, the first translated number data further comprising location data indicative of a geographical location of the IP device from which the second call connection request originated instead of a geographical location that is assigned to a user of the IP device, where the first telephone number is indicative of a first emergency telephone number dialed by the user of the IP device; and
translating the first translated number data, with the computer, into a second translated number data indicative of a second telephone number based on the location data indicative of the geographical location of the IP device from which the second call connection request originated instead of the geographical location that is assigned to the user of the IP device, wherein the second telephone number indicates where the first call connection request is to be connected, where the second telephone number is indicative of a second emergency telephone number associated with the geographical location of the IP device.

8. The method of claim 7 wherein translating the first translated number data further comprises applying a translation pattern to the first translated number data.

9. The method of claim 8 wherein the first translated number data comprises a string of alphanumeric digits, and applying the translation pattern to obtain a second translated number data indicative of a second telephone number comprises matching a site code contained within the string.

10. The method of claim 8 wherein applying the translation pattern comprises stripping a pre-dot digit from the first translated number data, wherein the first translated number data comprises a string of alphanumeric digits, and stripping the pre-dot digit comprises identifying and discarding a set of alphanumeric digits that correspond to a geographical area in which the geographical location of the IP device from which the second call connection request originated is located.

11. The method of claim 7 comprising connecting the first call connection request using the second translated number data.

12. The method of claim 11 comprising associating a Calling Line Identification (CLID) with the first call connection request so that the first call connection request can be matched to the geographical location of the IP device from which the second call connection request originated.

13. The method of claim 8 wherein applying the translation pattern exploits a Calling Search Space (CSS).

14. The method of claim 13 wherein the CSS contains the translation pattern, and the translation pattern comprises a translation pattern for an emergency number.

15. A voice over Internet Protocol (VoIP) system comprising:
a call data receiver configured to receive call data comprising number data indicative of a first telephone number associated with a first call connection request that originated at an Internet Protocol (IP) device on a VoIP network, the call data further comprising location data indicative of a geographical location of the IP device from which the first call connection request originated instead of a geographical location assigned to a user of the IP device, where the first telephone number is indicative of a first emergency telephone number associated with the geographical location assigned to the user of the IP device;
a translator configured to translate the number data into translated number data indicative of a second telephone number based on the location data indicative of the geographical location of the IP device from which the first call connection request originated instead of the geographical location assigned to the user of the IP device, where the second telephone number is indicative of a second emergency telephone number associated with the geographical location of the IP device;
a number data associator configured to associate the first call connection request with the translated number data;
a call forwarder configured to forward the first call connection request to a second call connection request associated with the translated number data indicative of the second telephone number; and
a call connection request receiver configured to receive the second call connection request associated with the translated number data indicative of the second telephone number, the translated number data associated with the first call connection request and the location data indicative of the geographical location of the IP device from which the first call connection request originated instead of the geographical location assigned to the user of the IP device.

16. Logic encoded in one or more non-transitory, tangible media for execution and when executed by a processor, performs the steps of:
receiving call data comprising number data indicative of a first telephone number associated with a call connection request that originated from an internet protocol (IP) device on a voice over internet protocol (VoIP) network, the call data further comprising location data indicative of a geographical location of the IP device from which the call connection request originated instead of a location assigned to a user of the IP device, where the first telephone number is indicative of a first emergency telephone number dialed by the user of the IP device;
translating the number data into translated number data indicative of a second telephone number based on the location data indicative of the geographical location of the IP device from which the call connection request originated instead of the location assigned to the user of the IP device, where the second telephone number is indicative of a second emergency telephone number associated with the geographical location of the IP device; and
forwarding the call connection request to the second telephone number.

17. Logic encoded in one or more non-transitory, tangible media for execution and when executed by a processor, is executable to:
receive a first call connection request associated with a first translated number data comprising a translation of a first number data indicative of a first telephone number associated with a second call connection request that originated from an internet protocol (IP) device on a Voice Over Internet Protocol (VoIP) network and the first call connection request further associated with location data that indicates a geographical location of the IP device from which the second call connection request originated instead of a geographical location assigned to a user of the IP device, where the first telephone number is indicative of a first emergency telephone number associated with the geographical location assigned to the user of the IP device;
translate the first translated number data into a second translated number data indicative of a second telephone number based on the location data that indicates the geographical location of the IP device from which the second call connection request originated instead of the geographical location assigned to the user of the IP device, where the second telephone number is indicative of a second emergency telephone number associated with the geographical location of the IP device; and
forward the first call connection request to the second telephone number.

18. The method of claim 1, wherein forwarding the call connection request with the computer to the second telephone number comprises forwarding the call connection request over a public switched telephone network.

19. The method of claim 11, wherein connecting the first call connection request using the second translated number data comprises connecting the first call connection request over a public switched telephone network.

* * * * *